(12) United States Patent
Lee et al.

(10) Patent No.: US 9,521,231 B2
(45) Date of Patent: Dec. 13, 2016

(54) METHOD AND APPARATUS FOR CONTROLLING OUTGOING CALL DURING PHONE BOOK INFORMATION DOWNLOAD

(71) Applicants: Hyundai Motor Company, Seoul (KR); Kia Motors Corporation, Seoul (KR)

(72) Inventors: Kyung Chul Lee, Gyeonggi-Do (KR); Kyu Seop Bang, Gyeonggi-Do (KR); Soon Kwon Paik, Gyeonggi-Do (KR); Woo Young Kwak, Gyeonggi-Do (KR); Jae Min Joh, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 12 days.

(21) Appl. No.: 14/540,347

(22) Filed: Nov. 13, 2014

(65) Prior Publication Data
US 2016/0028867 A1    Jan. 28, 2016

(30) Foreign Application Priority Data
Jul. 28, 2014    (KR) ........................ 10-2014-0095987

(51) Int. Cl.
*H04M 1/60*        (2006.01)
*H04M 1/2745*    (2006.01)

(52) U.S. Cl.
CPC ..... *H04M 1/6091* (2013.01); *H04M 1/274516* (2013.01)

(58) Field of Classification Search
CPC ............ H04M 1/6091; H04M 2250/02; H04M 3/4931; H04M 1/6075; H04M 1/72519; H04M 1/6083; H04M 1/274508
USPC ....... 455/569.2, 414.1, 41.2, 345; 701/2, 36, 701/24, 31.4, 29.1, 29.6, 33.2, 49, 533, 31.5, 701/34.2, 48, 25, 300, 34.4, 532
See application file for complete search history.

(56) References Cited

U.S. PATENT DOCUMENTS

| 2005/0130678 | A1* | 6/2005 | Jendbro | H04W 4/02 455/456.6 |
| 2013/0045677 | A1* | 2/2013 | Chien | H04W 76/023 455/39 |
| 2014/0119381 | A1* | 5/2014 | Diab | H04L 67/12 370/431 |

FOREIGN PATENT DOCUMENTS

| KR | 10-2009-0064855 A | 6/2009 |
| KR | 10-2010-069372 | 6/2010 |
| KR | 10-2013-0061529 | 6/2013 |
| KR | 10-2008-0034644 | 12/2013 |
| KR | 10-2014-0059663 A | 5/2014 |
| KR | 10-2010-0062256 | 9/2014 |

* cited by examiner

*Primary Examiner* — Inder Mehra
(74) *Attorney, Agent, or Firm* — Mintz Levin Cohn Ferris Glovsky and Popeo, P.C.; Peter F. Corless

(57) ABSTRACT

A method and apparatus for controlling an outgoing call during download of phone book information are provided. The method includes setting, by a controller, a communication channel with a user device when a vehicle is powered on. Additionally, the method includes transmitting, by the controller, a predetermined phone book download request signal to the user device via the set communication channel. The method may further include downloading, by the controller, new phone book information from the user device via the set communication channel. Furthermore, the method includes completing an outgoing call service request from a user using existing phone book information while new phone book information is downloaded.

26 Claims, 6 Drawing Sheets

METHOD AND APPARATUS FOR CONTROLLING OUTGOING CALL DURING PHONE BOOK INFORMATION DOWNLOAD

CROSS-REFERENCE(S) TO RELATED APPLICATION

This application claims the benefit of Korean Patent Application No. 10-2014-0095987, filed on Jul. 28, 2014, which is incorporated herein in its entirety by reference.

BACKGROUND

1. Field of the Invention

The present invention relates to a method and apparatus for controlling an outgoing call while phone book information is downloaded and, more particularly, to an outgoing call control method within a vehicle head unit capable of performing an outgoing call using existing phone book information while phone book information is downloaded from a Bluetooth paired device, when the outgoing call is requested during the download.

2. Discussion of the Related Art

The rapid development of information technology (IT) recently has influenced the vehicle industry and various IT technologies have commonly become used within vehicles. Particularly, Bluetooth technology that allows a vehicle to connect to a communication device, such as a smartphone, has been developed.

Generally, a Bluetooth connectivity of an in-vehicle head unit is automatically enabled and, in response, the in-vehicle head unit enters a standby mode. A driver of the vehicle may then perform a pairing operation via the in-vehicle head unit and the smartphone by inputting a selection from a predetermined menu. When the pairing operation is completed, the Bluetooth connection allows the driver to have a hands-free telephone conversation while driving.

To take advantage of the Bluetooth technology, a phone book and a call history from a connected mobile device must be transmitted to the in-vehicle head unit. A user may request an outgoing call using the received phone book information or a voice recognition technology disposed within the in-vehicle head unit. The phone book information may include the phone book and the call history. However, when an outgoing call is requested while the phone book information is received from the paired mobile device (e.g., prior to being downloaded), the request is usually not completed.

SUMMARY

An objective of the present invention provides an outgoing call control method capable of performing an outgoing call during reception of phone book information from a Bluetooth-connected user device and an apparatus for performing the same. Another objective of the present invention provides an outgoing call control method within an in-vehicle head unit capable of completing an outgoing call using existing phone book information while the in-vehicle head unit is receiving phone book information from a connected device.

Another further objective of the present invention provides an outgoing call control method within an in-vehicle head unit capable of adaptively transmitting a phone book update approval request message to a Bluetooth-paired user device based on phone book information received from the Bluetooth-paired user device. Yet another objective of the present invention provides an outgoing call control method within an in-vehicle head unit capable of deleting existing phone book information after automatic download of phone book information from a Bluetooth-paired user device is automatically downloaded in a background and complete an outgoing call while new phone book information is downloaded. A further objective of the present invention provides an outgoing call control method within an in-vehicle head unit capable of manually completing an outgoing call using existing phone book information within a vehicle system while phone book information is received from a user device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one exemplary embodiment of the present invention, an outgoing call control method within an in-vehicle head unit may include setting a communication channel with a user device when a vehicle is powered on, transmitting a predetermined phone book download request signal to the user device via the set communication channel, downloading new phone book information from the user device via the set communication channel, and completing an outgoing call service request from a user using existing phone book information while new phone book information is downloaded. The outgoing call control method may further include determining whether the new phone book information is the same as the existing phone book information when the download is completed.

When the new phone book information is not the same as the existing phone book information, a predetermined popup notification window to accept or refuse the phone book update may be displayed on a screen disposed within the in-vehicle head unit. The popup notification window may include at least one selected from the group consisting of: a first softkey configured to accept input for acceptance of the phone book update, a second softkey configured to accept input for refusal of the phone book update, and a string that indicates the phone book has been changed and a phone book update is required. When the new phone book information is the same as the existing phone book information, the popup notification window may not be displayed and the outgoing call service request may be completed using the existing phone book information.

When the phone book update is accepted based on user selection on the popup notification window, the outgoing call service request may be completed using the new phone book information. When the new phone book information is not the same as the existing phone book information, the existing phone book information stored in a memory may be replaced by the new phone book information.

When the existing phone book information is not present within the in-vehicle head unit and when the new phone book information is being downloaded, a predetermined notification message indicating that phone book information is not present and thus new phone book information is being downloaded from the user device may be displayed on the screen disposed within the in-vehicle head unit. The communication channel may include a short range communication channel. The short range communication channel may be at least one selected from the group consisting of: a Bluetooth communication channel, a near field communication (NFC) channel, and a Zigbee communication channel. The communication channel may also be a universal serial bus (USB) communication channel. Further, the communication channel may be automatically set when the vehicle is powered on. The new phone book information may be downloaded in a background (i.e., while running other applications in the in-vehicle head unit). The existing phone book information and the new phone book information may each include at least one selected from between a phone book and a call history.

In another exemplary embodiment of the present invention a computer readable medium containing program instructions that execute an outgoing call control method may be provided. In a further exemplary embodiment of the present invention, an in-vehicle head unit connected to a user device configured to communicate with other user devices may include a processor configured to: set a communication channel with the user device when a vehicle is powered on, transmit a predetermined phone book download request signal to the user device via the set communication channel, and download new phone book information from the user device via the set communication channel, while an outgoing call service request from a user is completed using existing phone book information while the new phone book information is downloaded.

The in-vehicle head unit may further include determining when the new phone book information is the same as the existing phone book information when the download is completed. When the new phone book information is not the same as the existing phone book information, a predetermined popup notification window for selecting acceptance or refusal of phone book update may be displayed on a screen disposed within the in-vehicle head unit. The popup notification window may include at least one selected from the group consisting of a first softkey configured to accept input for acceptance of the phone book update, a second softkey configured to accept input for refusal of the phone book update, and a string that indicates the phone book has been changed and a phone book update is needed.

When the new phone book information is the same as the existing phone book information, the popup notification window may not be displayed and the outgoing call request by the user may be complete via the existing phone book information. When the phone book update is accepted in response to the input selection on the popup notification window, the outgoing call request may be completed via the new phone book information.

When the new phone book information is not the same as the existing phone book information, the existing phone book information stored in a memory may be replaced by the new phone book information. When the existing phone book information is not present within the in-vehicle head unit when the new phone book information is downloaded, a predetermined notification message that indicates phone book information is not present and new phone book information is being downloaded from the user device may be displayed on a screen disposed at one side of the in-vehicle head unit. The communication channel may include a short range communication channel. The short range communication channel may include at least one selected from the group consisting of a Bluetooth communication channel, a near field communication (NFC) channel, and a Zigbee communication channel. The new phone book information may be downloaded in a background (i.e., while running other applications within the in-vehicle head unit). Furthermore, when phone book information is missing and new phone book information is being downloaded from the user device, a predetermined notification message may be displayed by the controller on a screen disposed within the in-vehicle head unit It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
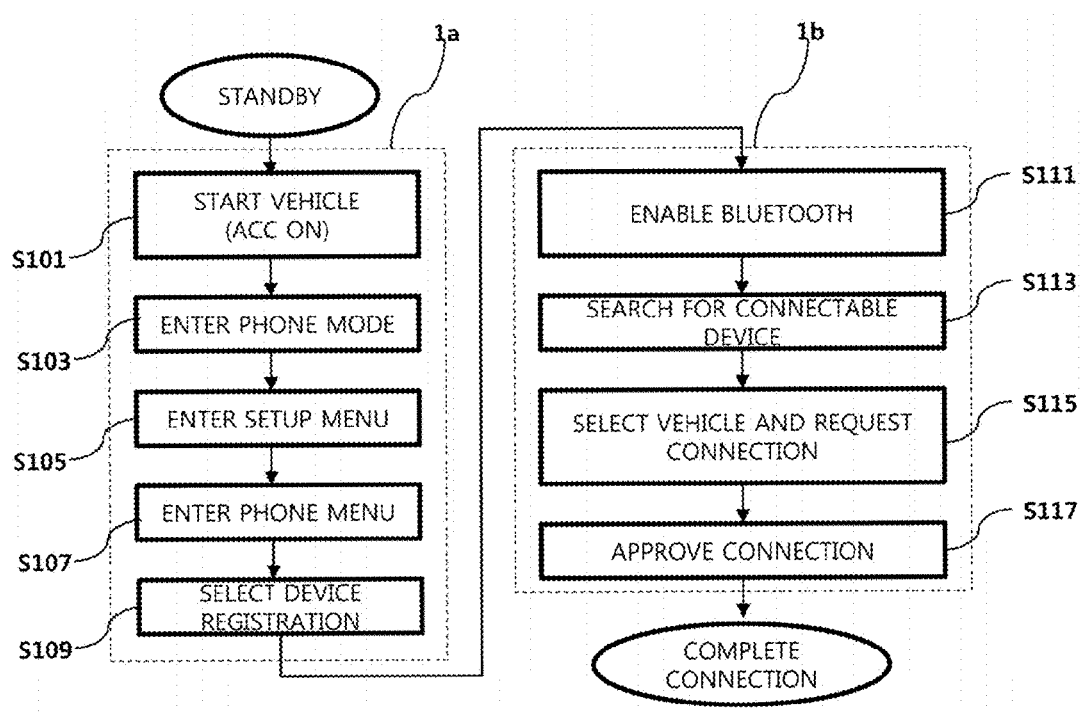
FIG. 1 is an exemplary view illustrating a conventional in-vehicle Bluetooth pairing procedure according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the exemplary embodiments of the present invention are described to be integrated into a single one or to be operated as a single one, the present invention is not necessarily limited to such exemplary embodiments. According to exemplary embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in a computer readable media such that the computer program is read and executed by a computer to implement exemplary embodiments of the present invention. Computer program storage media may include magnetic recording media, optical recording media, and carrier wave media.

It will be understood that, although the terms first, second, A, B, (a), (b), etc. may be used herein to describe various elements of the exemplary embodiments of the present invention, these terms are only used to distinguish one element from another element and essential, order, or sequence of corresponding elements are not limited by these terms. It will be understood that when one element is referred to as being "connected to", "coupled to", or "accessed by" another element, one element may be "connected to", "coupled to", or "accessed by" another element via a further element although one element may be directly connected to or directly accessed by another element.

Hereinafter, a conventional in-vehicle Bluetooth pairing procedure will be described in brief with reference to FIGS. 1 and 2. FIG. 1 is an exemplary view illustrating a conventional in-vehicle Bluetooth pairing procedure according to an exemplary embodiment of the present invention. Reference numeral 1a denotes a Bluetooth pairing procedure which may be performed in an in-vehicle head unit. Reference numeral 1b denotes a Bluetooth pairing procedure which may be performed in a user device. When a user starts a vehicle (S101), an in-vehicle head unit (H/U) may be executed by a controller to start an automatic Bluetooth pairing procedure. Accordingly, the in-vehicle head unit may enter a phone mode (S103) configured to pair the H/U with a pre-designated or pre-registered user device (e.g. a driver's smartphone). Additionally, a predetermined user interface screen, showing that an attempted connection to a specific device, may be configured to display the attempted connection on a display screen of the in-vehicle head unit.

When the pairing procedure automatically performed after starting of the vehicle is canceled by the user, the in-vehicle head unit may be operated by the controller to sequentially enter a setup menu (S105) and a phone menu (S107) configured to display a predetermined user interface screen, which may include a menu configured to register a new user device or select a pre-registered user device (S109). The predetermined user interface screen may also be a device registration selection screen, which will hereinafter be referred to as a "device registration selection screen" for the convenience of description (S105 to 109). Further, the user may designate a user device for pairing via menu selection on the device registration selection screen. Additionally, a predetermined guide message that indicates enablement of a Bluetooth function of the user device to allow the in-vehicle head unit to connect to the user device may be displayed on the display screen of the in-vehicle head unit.

A Bluetooth function may be enabled (S111) according to a guide message displayed on a screen of the user device. When the Bluetooth function of the user device is enabled by the user, the user device may be configured to search for surrounding devices capable of Bluetooth pairing and display the search result on the screen (S113). When a vehicle is selected based on the search result, the user device may be configured to transmit a connection request signal to the selected vehicle (S115). A predetermined passkey input screen into which a passkey value may be input corresponding to the selected vehicle may be displayed on a screen of the user device. When the connection request signal from the user device is received, the in-vehicle head unit may be configured to display vehicle information and the passkey value on the screen. When the passkey value is input to the passkey input screen, the user device may be configured to transmit the passkey value to the in-vehicle head unit. When the received passkey value is the same as a passkey value of the in-vehicle head unit, the in-vehicle head unit may be configured to transmit a predetermined approval completion message that indicates that the connection request has been approved to the user device (S117).

Figure 2:
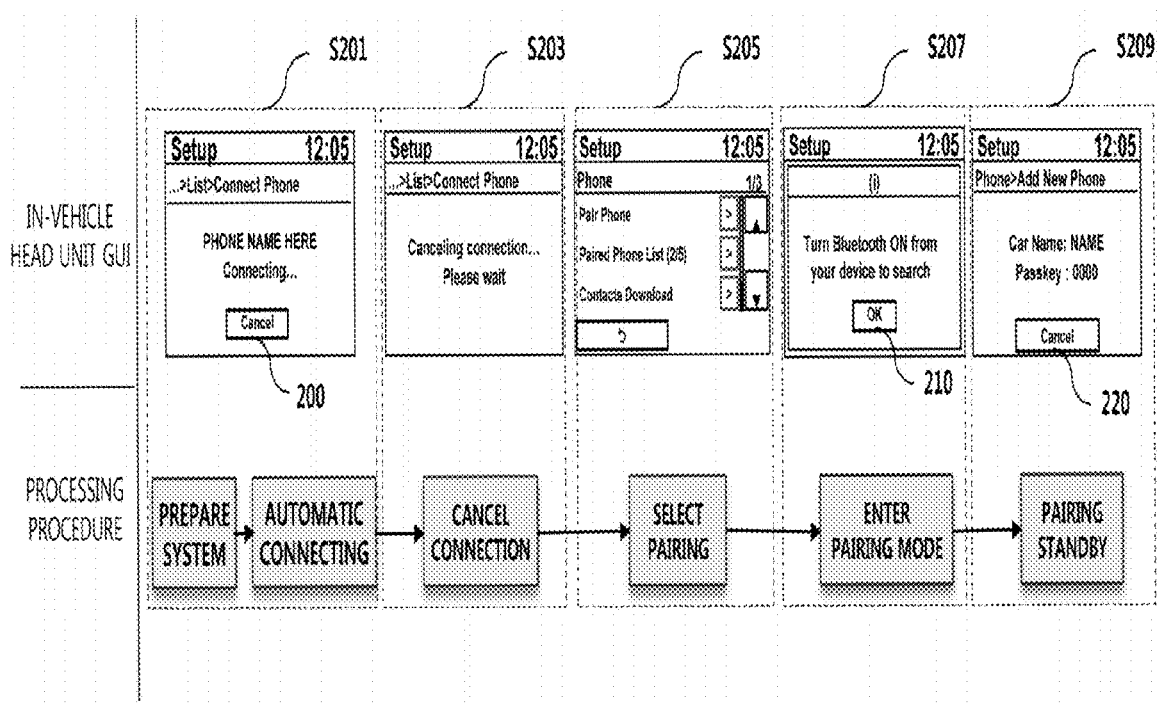
FIG. 2 is an exemplary view illustrating a user interface screen output to an in-vehicle head unit during the conventional Bluetooth pairing procedure according to an exemplary embodiment of the present invention.

FIG. 2 is an exemplary view illustrating a user interface screen output to the in-vehicle head unit during the conventional Bluetooth pairing procedure according to an exemplary embodiment of the present invention. Referring to FIG. 2, when the user starts the vehicle and an automatic pairing procedure is commenced, the in-vehicle head unit may be operated by the controller to output an automatic connection screen that informs a Bluetooth connection to a specific user device is being performed (S201). When a cancel button 200 is selected (e.g., clicked, engaged, etc.) on the automatic connection screen to cancel the automatic fairing, the in-vehicle head unit may be configured to display a screen for registering or selecting a device for pairing (S203 and S205).

Subsequently, when the device for pairing is designated, the in-vehicle head unit may be configured to display a predetermined Bluetooth connection guide message that indicates a Bluetooth function of the designated device should be enabled (S207). The user may then enable the Bluetooth function of the designated device in response to the Bluetooth connection guide message. When an OK button 210 is selected (e.g. clicked, engaged, etc.), the in-vehicle head unit may be configured to display a vehicle name and a passkey value to be used to register a new device and may be configured to enter a pairing standby state (S209). When a cancel button 220 is selected in the pairing standby state, the in-vehicle head unit may be configured to finish the pairing procedure. In another example, a conventional in-vehicle Bluetooth pairing method that uses a pairing application may also be used. The user may download a pairing application from the Internet and install the pairing application within the user device. In the in-vehicle Bluetooth pairing method using the pairing application, however, the pairing application must be downloaded and installed in the user device. Furthermore, the pairing application may not be compatible with all devices. For example, a specific pairing application may be operated only in devices that use a particular operation system. In addition, the number of the user manipulation steps for pairing in the in-vehicle head unit may not be reduced when the pairing application is used.

When the vehicle driver requests to perform Bluetooth pairing with a new user device as described above, it may be necessary to sequentially perform the steps of entering the phone mode on the in-vehicle head unit, canceling the automatic pairing procedure, entering the setup menu, entering the phone menu, and selecting the device for pairing.

Figure 3:
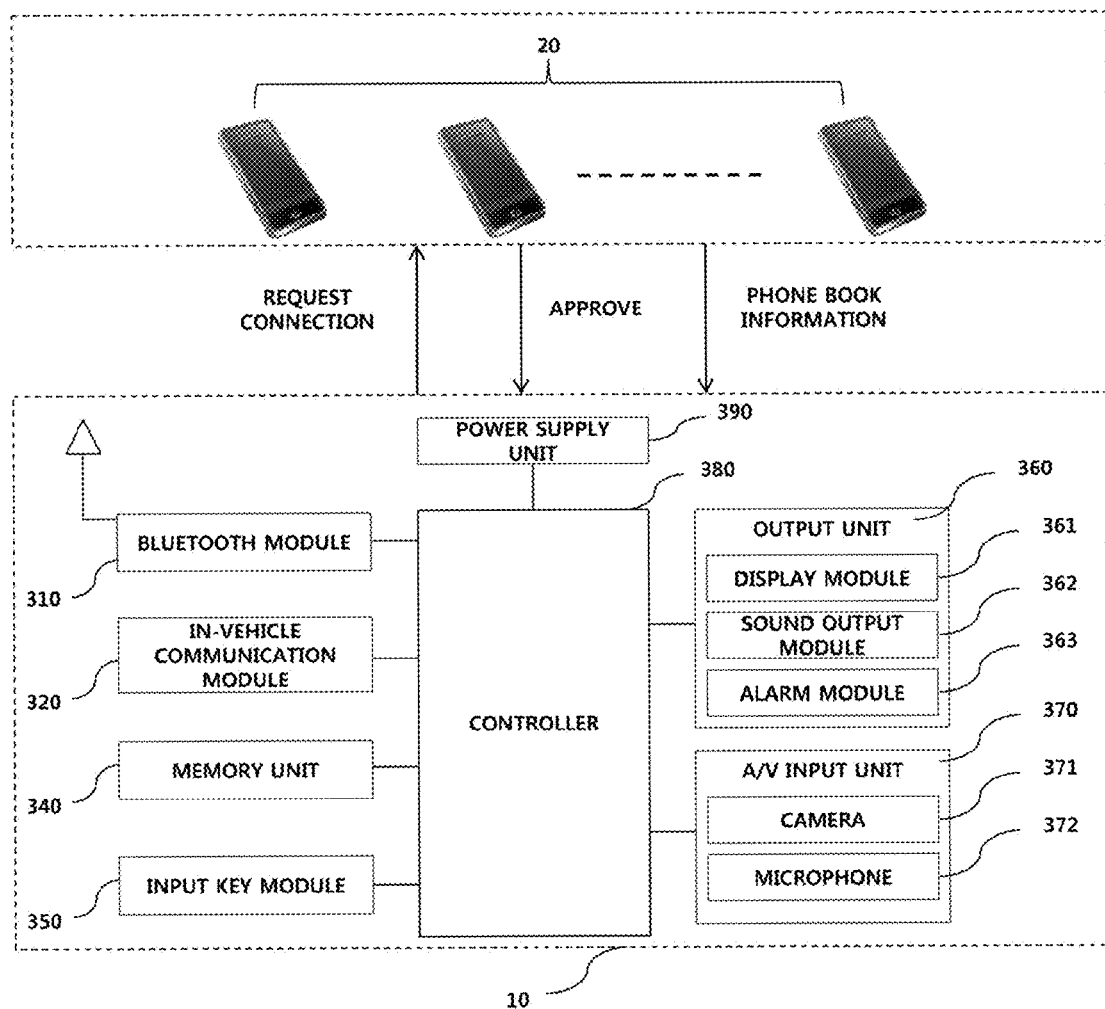
FIG. 3 is an exemplary view showing a configuration of an in-vehicle Bluetooth pairing system according to an exemplary embodiment of the present invention.

FIG. 3 is an exemplary view showing a configuration of an in-vehicle hands-free conversation system according to an exemplary embodiment of the present invention. The in-vehicle hands-free conversation system may include a user device 20 and an in-vehicle head unit 10. The in-vehicle head unit 10 may include a Bluetooth module 310, an in-vehicle communication module 320, a memory 340, an input key module 350, an output unit 360, an audio/video (A/V) input unit 370, a controller 380, and a power supply unit 390. The controller 380 may be configured to operate the Bluetooth module 310, the in-vehicle communication module 320, the memory 340, the input key module 350, the output unit 360, the A/V input unit 370, and the power supply unit 390.

The Bluetooth module 310 may include a baseband module configured to process a baseband signal according to a Bluetooth standard, a power amplifier configured to amplify the baseband signal, a band pass filter (BPF) configured to convert the amplified baseband signal into a transmission frequency band or pass a signal having a predetermined frequency band selected from among radio frequency (RF) signals received via an antenna, a low noise amplifier (LNA) configured to amplify the band-passed RF signal to be recognized and transmit the RF signal to the baseband module, and an antenna for configured to transmit and receive the RF signal.

Additionally, the Bluetooth module 310 may be configured to perform Bluetooth communication with the user device 20, when a Bluetooth function has been enabled, via a predetermined control procedure. In other words, the Bluetooth module 310 may be configured to transmit a predetermined Bluetooth connection request signal to the user device 20 and receive an approval signal for the Bluetooth connection request from the user device 20. When approval is completed, the Bluetooth module 310 may be configured to receive phone book information stored within the user device 20 and store the phone book information within the memory 340.

The in-vehicle communication module 320 may be configured to communicate with an electronic control unit (ECU) disposed within the vehicle. For example, when the vehicle is started, the in-vehicle communication module 320 may receive a control signal that indicates ACC ON from the ECU, which may be configured to determine starting of the vehicle and transmit the control signal to the controller 380. The controller 380 may be configured to apply power to the in-vehicle head unit and may also be configured to commence an automatic pairing procedure. Further, the memory 340 may be configured to store programs for operating the controller 380 and sub modules operated by the controller 380. Furthermore, the memory 340 may also be configured to temporarily store input/output data (e.g., phone book information, messages, still images, videos, application programs, and the like).

The phone book information may include at least one selected from the group consisting of a phone book and a call history. The phone book information may be classified into existing phone book information and new phone book information. The existing phone book information may be phone book information received from the user device 20 via a previous Bluetooth pairing. The existing phone book information may be retained in a predetermined recording region of the memory 340 until new phone book information is received from the user device 20. The new phone book information may be phone book information currently being downloaded from the user device 20. When download of the new phone book information is completed, the existing phone book information may be deleted from the memory 340.

In another exemplary embodiment of the present invention, the memory 340 may be configured to retain existing phone book information and new phone book information for a plurality of user devices 20. Accordingly, the controller 380 may be configured to identify which user device 20 specific phone book information is from using predetermined user device identifiers.

The memory unit 340 may be partitioned into a cache memory region and a general memory region. The cache memory region may be configured to retain phone book information being used for more rapid data processing. In addition, the cache memory may be a volatile memory (e.g., short term memory). Consequently, data stored in the cache memory region may be deleted when the vehicle is powered off. Alternatively, the general memory may be a non-volatile memory (e.g., long term memory). Consequently, data stored in the general memory region may be retained even when the vehicle is powered off. For example, when the in-vehicle head unit 10 is receiving new phone book information from the user device 20, the existing phone book information may be retained in the cache memory region and the new phone book information may be stored in the general memory region. Further, when the new phone book information is downloaded and the phone book update is accepted, the new phone book information stored in the general memory region may also be copied to the cache memory region.

The application programs may include programs for Bluetooth hands-free communication, navigation, games, chatting, web surfing, schedule management, and multimedia reproduction, or the like. Additionally, the memory 340 may be configured to store data of various vibration and sound patterns output in response to an input on a touchscreen. The memory 340 may include at least one selected from the group consisting of: a flash memory, a hard disk, a multimedia card micro, a card type (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The input key module 350 may be configured to generate input data for operating the in-vehicle head unit 10. The input key module 350 may include a key pad, a dome switch, a touch pad (static pressure/electrostatic), a jog wheel, and a jog switch. The output unit 360 may be configured to generate an output relevant to a sense of sight, hearing, or touch. The output unit 360 may include a display module 361, a sound output module 352, and an alarm module 363. The controller 380 may be configured to execute the display module 361, the sound output module 352, and the alarm module 363. The display module 361 may be configured to display information processed by the in-vehicle head unit 10. For example, when the in-vehicle head unit 10 is in a Bluetooth hands-free conversation mode, the display module 361 may be configured display a user interface (UI) or graphical user interface (GUI) related to the Bluetooth hands-free conversation mode. Alternatively, when the in-vehicle head unit 10 is in a navigation mode, the display module 361 may be configured to display a user interface (UI) or graphical user interface (GUI) related to travel guidance. The display module 361 may include at least one selected from the group consisting of: a liquid crystal display (LCD), a thin film transistor-liquid crystal display, an organic light-emitting diode (OLED), a flexible display, and a three-dimensional (3D) display. According to a configuration of the in-vehicle head unit 10, two or more display modules 361 may also be provided. For example, the display modules 361 may be disposed at one side of the in-vehicle head unit 10 separately or integrally. Alternatively, the display modules 361 may be disposed at opposite sides of the in-vehicle head unit 10.

When the display module 361 and a touch sensor form a touchscreen (e.g. formed as a single layer), the display module 361 may be used as an input device as well as an output device. The touch sensor may include a touch film, a touch sheet, or a touchpad. Additionally, the touch sensor may be configured to convert pressure applied to a specific portion of the display module 361 or change capacitance generated from a specific portion of the display module 361 to an electric input signal. Further, the touch sensor may be configured to sense pressure of a touch as well as a touched position or area. When the touch sensor receives input, a signal(s) corresponding to the touch may be transmitted to a touch controller. The touch controller may be configured to process the signal(s) and then transmit data that corresponds to the processed signal(s) to the controller 380. Therefore, the controller 380 may be configured to recognize which portion of the display module 361 has been touched.

The sound output module 362 may be configured to output audio data received via the Bluetooth module 310 or stored in the memory 340 when in a Bluetooth hands-free conversation mode, a Bluetooth pairing mode, a sound/video reproduction mode, and a navigation mode. In addition, the sound output module 362 may be configured to output a sound effect signal in response to an action (e.g., a call signal reception sound, a message reception sound, or a pairing completion sound) performed by the in-vehicle head unit 10. The sound output module 362 may include a receiver, a speaker, and a buzzer. In addition, the sound output module 362 may be configured to output sound via an earphone jack disposed within a side of the in-vehicle head unit 10.

The alarm module 363 may be configured to output signals that notify that events have been generated within the in-vehicle head unit 10. Examples of events generated within the in-vehicle head unit 10 may include call signal reception, message reception, key signal input, touch input, and reception of vehicle state information from the in-vehicle communication module 320. The vehicle state information may include a door opening, an engine overheating, a lane deviation, and a fuel state. The alarm module 363 may be configured to output at least one selected from the group consisting of vibration signals, video signals, and audio signals. The video signals and the audio signals may also be output via the display module 361 and the sound output module 362, respectively.

The A/V input unit 370 may be configured to input audio signals or video signals. The A/V input unit 370 may include an imaging device (e.g., camera, video camera, etc.) 371 and a microphone 372. The imaging device 371 may be configured to process image frames, such as still images or videos, acquired by an image sensor in a video conversation mode or in a capturing mode. The processed image frames may be displayed on the display module 361. In addition, the imaging device 371 may be configured to capture images behind the vehicle when the vehicle is moving backwards (e.g., reversing). The captured images may be output via the display module 361. The image frames processed by the imaging device 371 may be stored in the memory 340 or transmitted to the user device 20 via the Bluetooth module 310. Additionally, two or more imaging devices 371 may be provided.

The microphone 372 may be configured to receive external sound signals and convert the received sound signals into electrical voice data in a telephone conversation mode, a recording mode, or a voice recognition mode. In the telephone conversation mode, the converted voice data may be transmitted to the paired user device 20 via the Bluetooth module 310. In the voice recognition mode, the microphone 372 may be configured to transmit the converted voice data to the controller 380. The controller 380 may be configured to perform voice recognition for the received voice data using a stored voice recognition database.

The power supply unit 390 may be configured to supply power necessary to operate the in-vehicle head unit 10. When the vehicle is powered ON, the power supply unit 390 may be configured to automatically supply power to the in-vehicle head unit 10. When the vehicle is powered OFF, the power supply unit 390 may be configured to automatically discontinue the power supply to the in-vehicle head unit 10.

The controller 380 may be configured to supervise operation of the in-vehicle head unit 10. For example, the controller 380 may be configured to supervise a communication function including hands-free conversation via Bluetooth pairing, data communication, and video communication. In addition, the controller 380 may be configured to execute application installation and operation. Further, the controller 380 may be configured to perform pattern recognition processing to recognize a writing input or a drawing input performed on the touchscreen as text and images.

Moreover, when the Bluetooth pairing is completed, the controller 380 may be configured to identify the user device 20. When the existing phone book information corresponding to the identified user device 20 is present in the memory 340, the controller 380 may be configured to complete an outgoing call request using the existing phone book information until new phone book information is received from the identified user device 20.

Additionally, the controller 380 may be configured to compare the new phone book information from the user device 20 with the existing phone book information. When the new phone book information received from the user device 20 is not the same as the existing phone book information, the controller 380 may be configured to initiate a predetermined popup notification window that indicates the existing phone book information must be updated to the new phone book information to be displayed. The popup notification window may be displayed on a screen of the user device 20. Acceptance or refusal of phone book update may be input on the popup notification window. When the phone book update is accepted, the controller 380 may be configured to update the existing phone book information to the new phone book information.

In another exemplary embodiment of the present invention, the popup notification window may be displayed via the display module 361 of the in-vehicle head unit 10. In a further exemplary embodiment of the present invention, the popup notification window may be displayed on both the screen of the user device 20 and the screen of the in-vehicle head unit 10. In particular, when acceptance of phone book update via one of the popup notification windows displayed is received, the controller 380 may be configured to perform a phone book update procedure to update the existing phone book information to the new phone book information.

When the new phone book information is the same as the existing phone book information, the controller 380 may be configured to prevent a popup notification window configured to receive acceptance or refusal of phone book update input and complete the outgoing call request using the existing phone book information.

When a new phone book is being downloaded from the user device 20 without existing phone book information present, the controller 380 may be configured to initiate a predetermined notification message that indicates the existing phone book information is not present and new phone book information is being received from the user device 20.

Figure 4A:
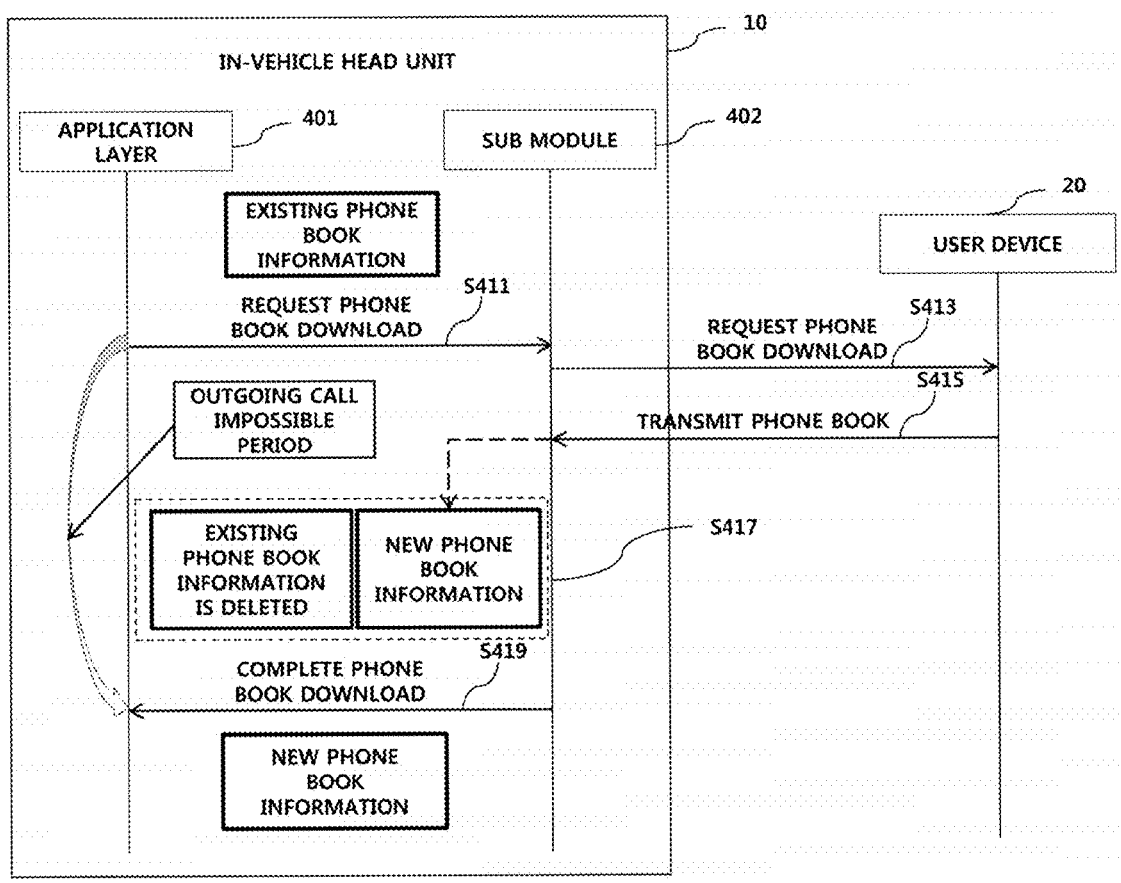
FIG. 4A is an exemplary flowchart illustrating a conventional phone book download procedure according to an exemplary embodiment of the present invention.
Figure 4B:
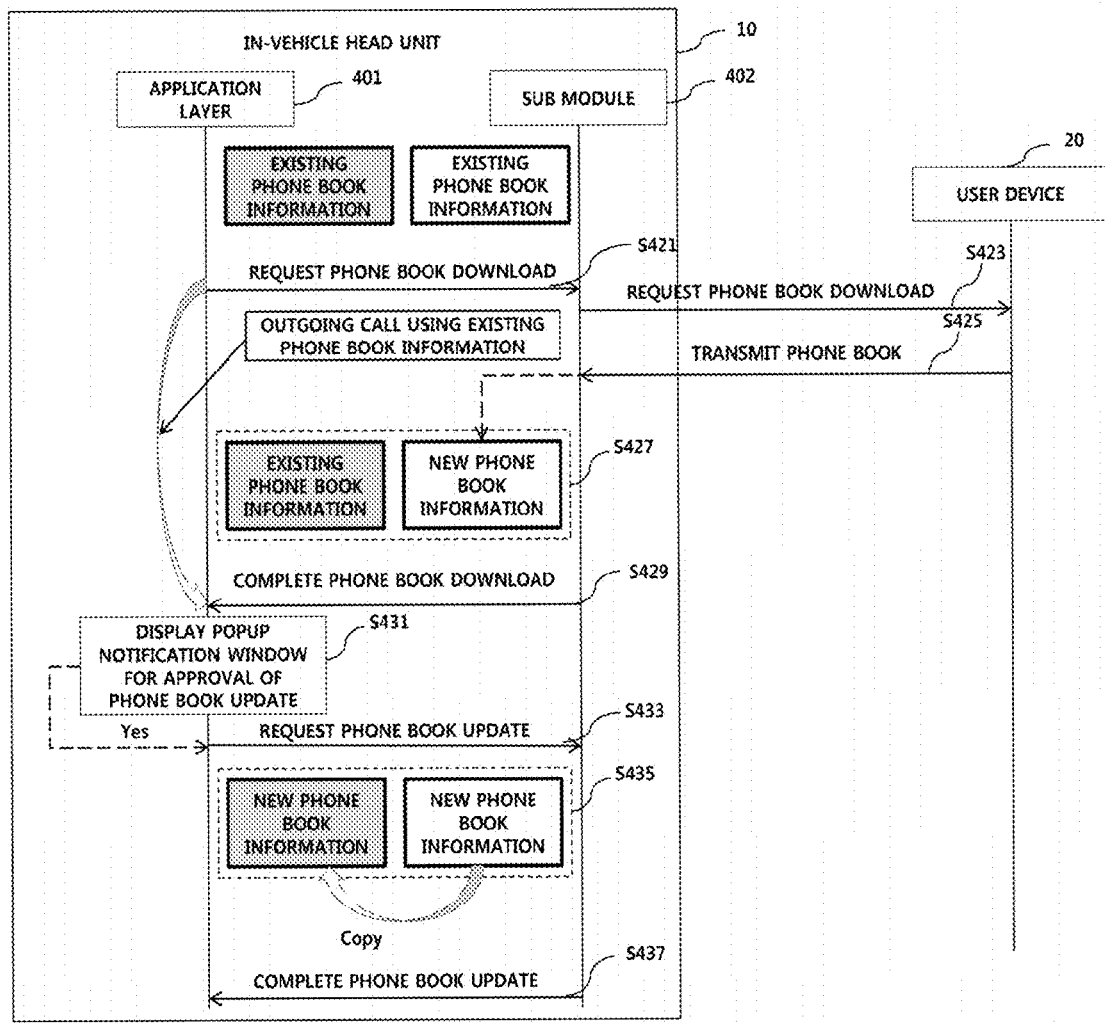
FIG. 4B is an exemplary flowchart illustrating a phone book download procedure according to an exemplary embodiment of the present invention.

FIGS. 4A and 4B are exemplary flowcharts showing comparison between a phone book download procedure according to an exemplary embodiment of the present invention and a conventional phone book download procedure according to related art. Specifically, FIG. 4A is an exemplary flowchart illustrating a conventional phone book download procedure and FIG. 4B, according to related art, is an exemplary flowchart illustrating a phone book download procedure according to an exemplary embodiment of the present invention.

Referring to FIG. 4A, when the vehicle is powered on and the user device 20 is connected via Bluetooth, a specific application layer 401, such as a hands-free communication profile, of the in-vehicle head unit 10 creates and transmits a phone book download request signal to a sub module 402, such as the Bluetooth module 310 (S411). Subsequently, the sub module 402 of the in-vehicle head unit 10 transmits the phone book download request signal to the user device 20 via a predetermined Bluetooth communication channel (S413).

The user device 20 may be configured to transmit phone book information stored within an internal memory of the sub module 402 via the Bluetooth communication channel (S415). When download of the phone book information from the user device 20 starts, the existing phone book information may be deleted from the memory and new phone book information may be stored in the memory (S417).

When the new phone book information is received, the sub module 402 may be configured to transmit a predetermined control signal that indicates download of the phone book information has been completed to the application layer 401 (S419). Subsequently, the application layer 401 may be configured to process the outgoing call request using the new phone book information.

In the conventional phone book download procedure, the outgoing call cannot be completed when the phone book download is requested until the phone book download is completed. In other words, existing phone book information is not accessible when new phone book information is being downloaded and the in-vehicle head unit 10 cannot complete the outgoing call request.

An improved phone book download procedure according to an exemplary embodiment of present invention may complete an outgoing call using the existing phone book information simultaneously while new phone book information is being downloaded. Hereinafter, an exemplary phone book download procedure according to an exemplary embodiment of the present invention will be described in detail with reference to FIG. 4B. Referring to FIG. 4B, when the vehicle is powered on the user device 20 is connected via Bluetooth, a specific application layer 401, such as a hands-free communication profile (service), of the in-vehicle head unit 10 may be configured to generate and transmit a phone book download request signal to a sub module 402, such as the Bluetooth module 310, of the in-vehicle head unit 10 (S421). Subsequently, the sub module 402 of the in-vehicle head unit 10 may be configured to transmit the received phone book download request signal to the user device 20 via a predetermined Bluetooth communication channel (S423). The sub module 402 may be configured to receive phone book information stored in the user device 20 via the Bluetooth communication channel (S425).

Further, the sub module 402 may be configured to store new phone book information received from the user device 20, in the general memory region and retain the existing phone book information in the cache memory region (S427). Subsequently, even while the new phone book information is being downloaded, an outgoing call request may be completed using the existing phone book information.

When the new phone book information is downloaded, the sub module 402 may be configured to transmit a predetermined control signal, that indicates download of the phone book information is complete, to the application layer 401 (S429). The application layer 401 may be configured to display a predetermined popup notification window to select acceptance or refusal of phone book update on the screen of the in-vehicle head unit 10 (S431). The popup notification window may include a predetermined string that indicates the phone book is changed and the phone book needs to be updated, as well as Yes and No softkeys for acceptance and refusal, respectively.

When the phone book update is accepted by the user (i.e., the Yes softkey of the popup notification window is selected), the application layer 401 may be configured to transmit a predetermined phone book update request signal to the sub module 402 (S433). Subsequently, the sub module 402 may be configured to copy the received new phone book information to the cache memory region, where the existing phone book information is retained (S435). Subsequently, the sub module 402 may be configured to transmit a predetermined control signal, which indicates the phone book update has been completed, to the application layer 401 (S437).

Figure 5:
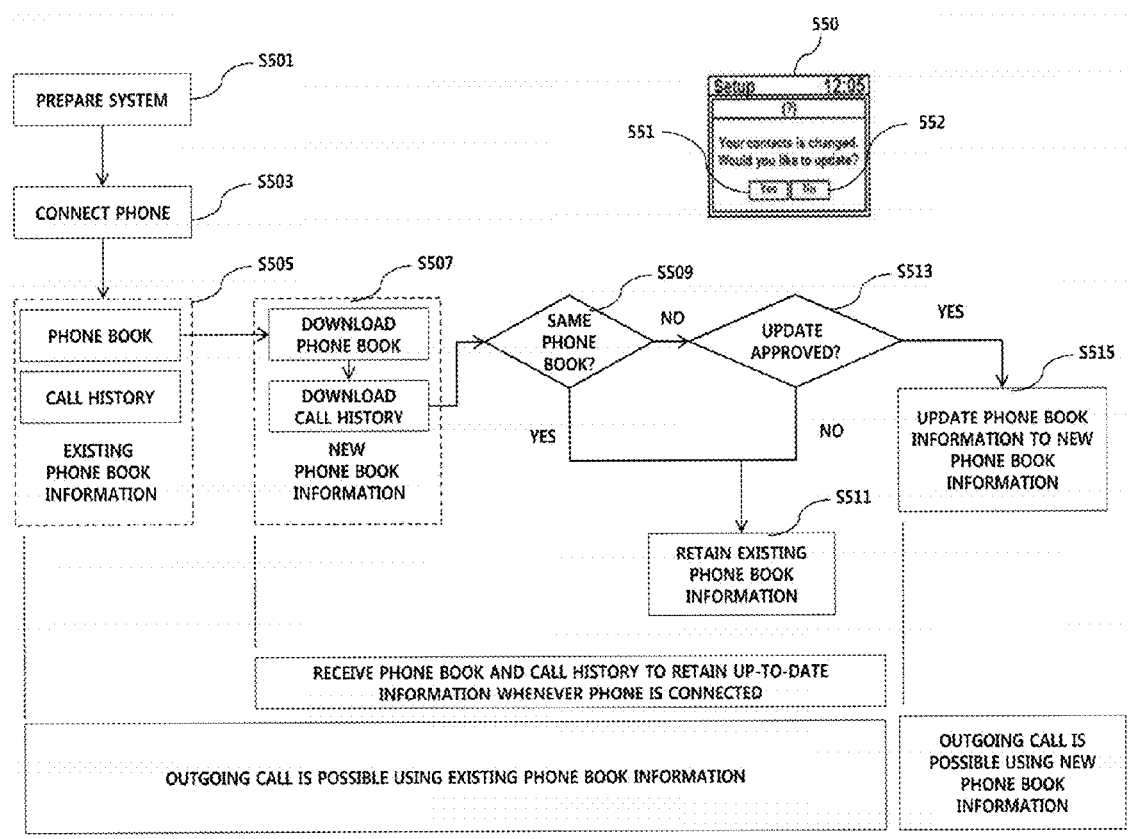
FIG. 5 is an exemplary flowchart illustrating an outgoing call control method in an in-vehicle head unit according to an exemplary embodiment of the present invention.

FIG. 5 is an exemplary flowchart illustrating an outgoing call control method in an in-vehicle head unit according to an exemplary embodiment of the present invention. Referring to FIG. 5, when the vehicle is turned on and the vehicle system is prepared (S501), an in-vehicle head unit 10 may be configured to perform an automatic Bluetooth connecting procedure to connect with the user device 20 (S503). An existing phone book information stored in a memory 340 of the in-vehicle head unit 10 may then be copied to a cache memory region (S505).

Subsequently, the in-vehicle head unit 10 may be configured to perform a predetermined phone book download procedure to download new phone book information within a background (e.g., while the in-vehicle head unit 10 runs other applications) and store the new phone book information in a general memory region (S507). The new phone book information may include a phone book and a call history. The in-vehicle head unit 10 may be configured to sequentially download and store the phone book and the call history in the general memory region. Therefore, it may not possible for a user to determine whether the new phone book information is being downloaded with the naked eye. In other words, the in-vehicle head unit 10 may be configured to automatically connect to the user device 20 via Bluetooth and automatically download the phone book information stored within the user device 20. At this time, it should be noted that the in-vehicle head unit 10 provides an outgoing call service using the existing phone book information during download of the new phone book information from the user device 20.

The in-vehicle head unit 10 may be configured to determine whether the new phone book information is the same as the existing phone book information (S509) when the new phone book information is completely downloaded. When the new phone book information is the same as the existing phone book information, the in-vehicle head unit 10 may be configured to complete an outgoing call service request by the user using the existing phone book information (S511). Alternatively, when the new phone book information is different from the existing phone book information, the in-vehicle head unit 10 may be configured to display a predetermined popup notification window that indicates the phone book information is different and the user needs to approve a phone book update at one side of the screen of the in-vehicle head unit 10. Further, the in-vehicle head unit may be configured to sense a user input from the popup notification window (S513). For example, the popup notification window may include a message: "Phone book has been changed. Would you like to update?" as denoted by reference numeral 550, and Yes and No softkeys (551 and 552, respectively) for acceptance and refusal of the phone book update.

When the phone book update is accepted, the in-vehicle head unit 10 may be configured to replace the existing phone book information stored in the cache memory region with the new phone book information and complete the outgoing call service request using the new phone book information (S515). In the above exemplary embodiment, the in-vehicle head unit 10 and the user device 20 may be connected via Bluetooth to perform the phone book download procedure. In another exemplary embodiment of the present invention, the in-vehicle head unit 10 may also be configured to perform the phone book download procedure via a universal serial bus (USB) communication cable. Accordingly, a USB connection terminal may be provided at one side of the in-vehicle head unit 10.

In a further exemplary embodiment of the present invention, the in-vehicle head unit 10 may be configured to perform the phone book download procedure via short range communication methods, such as near field communication (NFC), Zigbee, Wi-Fi, and the like.

As is apparent from the above description, the method and apparatus according to the present invention have the following effects.

First, the present invention may be capable of completing an outgoing call request while new phone book information is downloaded from a Bluetooth-paired user device.

Second, the present invention may provide an outgoing call control method within an in-vehicle head unit capable of performing the outgoing call using existing phone book information while new phone book information is downloaded from a paired user device.

Third, the present invention may provide an outgoing call control method within an in-vehicle head unit that is capable of adaptively transmitting a phone book update approval request message to a Bluetooth-paired user device based on whether phone book information received from the Bluetooth-paired user device is the same as existing phone book information.

Fourth, the present invention may provide an outgoing call control method within an in-vehicle head unit capable of deleting existing phone book information after automatic download of phone book information from a Bluetooth-paired user device in a background to perform an outgoing call while new phone book information is downloaded.

Fifth, the present invention may provide an outgoing call control method within an in-vehicle head unit capable of manually performing an outgoing call using existing phone book information within a vehicle system during reception of phone book information from a user device.

Sixth, the present invention may provide an outgoing call control method capable of displaying a popup notification window for approval of phone book update when downloaded new phone book information is different from existing phone book information, which may minimize user inconvenience.

It will be appreciated by persons skilled in the art that the present invention is not limited to what has been particularly described hereinabove and other advantages of the present invention will be more clearly understood from the above detailed description. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An outgoing call control method in an in-vehicle head unit, comprising:
   setting, by a communication module, a communication channel with a user device when the in-vehicle head unit is powered on;
   transmitting, a controller, a predetermined phone book download request signal to the user device via the communication channel set by the communication module;
   downloading, by the controller, new phone book information from the user device via the communication channel set by the communication module; and completing, by the controller, an outgoing call request using existing phone book information when such information is stored in a memory unit, while the new phone book information is downloaded from the user device by the controller via the communication channel set by the communication module.

2. The outgoing call control method according to claim 1, further comprising:
determining, by the controller, whether the new phone book information is the same as the existing phone book information when the new phone book information is completely downloaded.

3. The outgoing call control method according to claim 2, further comprising:
displaying, by the controller, a predetermined popup notification window for selecting acceptance or refusal of a phone book update on a screen disposed within the in-vehicle head unit when the new phone book information is not the same as the existing phone book information.

4. The outgoing call control method according to claim 3, wherein the popup notification window comprises at least one selected from the group consisting of: a first softkey for inputting user acceptance of the phone book update; a second softkey for inputting user refusal of the phone book update; and a string that indicates the phone book information has been changed and update of the phone book is required.

5. The outgoing call control method according to claim 3, further comprising:
preventing, by the controller, the popup notification window when the new phone book information is the same as the existing phone book information; and
completing, by the controller, the outgoing call request using the existing phone book information.

6. The outgoing call control method according to claim 3, further comprising:
completing, by the controller, the outgoing call service request using the new phone book information when the phone book update is accepted based on the user selection on the popup notification window.

7. The outgoing call control method according to claim 2, further comprising:
replacing, by the controller, the existing phone book information in the memory unit with the downloaded new phone book information when the new phone book information is different from the existing phone book information; and
storing, by the controller, the new phone book information in the memory unit.

8. The outgoing call control method according to claim 1, further comprising:
displaying, by the controller, a predetermined notification message indicating that phone book information is missing and new phone book information is being downloaded from the user device on a screen disposed within the in-vehicle head unit.

9. The outgoing call control method according to claim 1, wherein the communication channel includes a short range communication channel.

10. The outgoing call control method according to claim 9, wherein the short range communication channel further includes at least one selected from the group consisting of: a Bluetooth communication channel, a near field communication (NFC) channel, and a Zigbee communication channel.

11. The outgoing call control method according to claim 1, wherein the communication channel includes a universal serial bus (USB) communication channel.

12. The outgoing call control method according to claim 1, further comprising:
downloading, by the controller, the new phone book information in a background.

13. The outgoing call control method according to claim 1, wherein the existing phone book information and the new phone book information each include at least one of a phone book and a call history.

14. A non-transitory computer readable storage medium comprising computer-executable program code which, when the program code is executed on a computer, is configured to cause the computer to:
transmit a predetermined phone book download request signal to user device via a communication channel with the user device set by a communication module when an in-vehicle head unit powered on;
download new phone book information from the use device via the communication channel set by the communication module; and
complete an outgoing call request using existing phone book information when such information is stored in a memory unit, while the new phone book information is downloaded from the user device via the communication channel set by the communication module.

15. The non-transitory computer readable storage medium of claim 14, further comprising:
computer-executable program code which, when the program code is executed on the computer, is configured to cause the computer to determine whether the new phone book information is the same as the existing phone book information when the new phone book information is completely downloaded.

16. An apparatus for completing an outgoing call request, comprising:
a memory unit configured to store existing phonebook information;
a communication module configured to set a communication channel with a user device when an in-vehicle head unit is powered on; and
a controller configured to:
transmit a predetermined phone book download request signal to the user device via the communication channel set by the communication module;
download new phone book information from the user device via the communication channel set by the communication module; and
complete the outgoing call request using the existing phone book information stored in the memory unit, while the new phone book information is downloaded from the user device by the controller via the communication channel set by the communication module.

17. The apparatus for completing an outgoing call request according to claim 16, wherein the controller is further configured to determine whether the new phone book information is the same as the existing phone book information when the new phone book information is completely downloaded.

18. The apparatus for completing an outgoing call request according to claim 17, wherein the controller is further configured to display, in the popup notification window, at least one selected from the group consisting of: a first softkey for inputting user acceptance of the phone book update; a second softkey for inputting user refusal of the phone book update; and a string that indicates the phone book has been changed and update of the phone book is needed.

19. The apparatus for completing an outgoing call request according to claim 17, wherein the controller is further configured to:
prevent the popup notification window when the new phone book information is not the same as the existing phone book information; and
complete the outgoing call request using the existing phone book information.

20. The apparatus for completing an outgoing call request according to claim 16, wherein the controller is further configured to display a predetermined popup notification window for selecting acceptance or refusal of a phone book on a screen disposed within the in-vehicle head unit when the new phone book information is different from the existing phone book information.

21. The apparatus for completing an outgoing call request according to claim 20, wherein the controller is further configured to:
complete the outgoing call request using the new phone book information when the phone book update is accepted according to user selection on the popup notification window.

22. The apparatus for completing an outgoing call request according to claim 16, wherein the controller is further configured to:
replace the existing phone book information retained in the memory unit with the new phone book information when the new phone book information is different from the existing phone book information; and
store the new phone book information in the memory unit.

23. The apparatus for completing an outgoing call request according to claim 16, wherein the controller is further configured to:
display a predetermined notification message indicating that phone book information is missing and new phone book information is being downloaded from the user device on a screen disposed within the in-vehicle head unit when the existing phone book information is missing within the in-vehicle head unit while the new phone book information is being downloaded.

24. The apparatus for completing an outgoing call request according to claim 16, wherein the communication channel includes a short range communication channel.

25. The apparatus for completing an outgoing call request according to claim 24, wherein the short range communication channel further includes at least one selected from the group consisting of: a Bluetooth communication channel, a near field communication (NFC) channel, and a Zigbee communication channel.

26. The apparatus for completing an outgoing call request according to claim 16, wherein the controller is further configured to download the new phone book information in a background.

* * * * *